United States Patent Office 3,453,235
Patented July 1, 1969

3,453,235
PHOSPHONITRILIC POLYMERS FROM PHENOXY SUBSTITUTED PHOSPHONITRILIC HALIDES AND BISPHENOLS
Gerald J. Klender, Bloomingdale, N.J., assignor to Uniroyal, Inc., a corporation of New Jersey
No Drawing. Filed Jan. 28, 1966, Ser. No. 523,562
Int. Cl. C08g 33/16
U.S. Cl. 260—47                                    10 Claims

ABSTRACT OF THE DISCLOSURE

This invention relates to a process for preparing polymers by reacting a halogen-substituted trimeric phosphonitrile containing blocking groups with a dialkali metal salt of a specified aromatic diol and to the products of this process.

This invention relates to improved, thermally stable polymers derived from substituted trimeric phosphonitriles. More specifically, the invention concerns polymers produced by the copolymerization of compounds or mixtures of compounds of the formula $P_3N_3X_aY_b$, in which X represents thermally stable, unreactive or blocking groups such as phenyl or phenoxy and Y represents halogen, with aliphatic or aromatic diols or the salts of aliphatic or aromatic diols. In the formula $P_3N_3X_aY_b$, the subscript $a$ can vary from 3 to 4, the subscript $b$ can vary from 0 to 2; the sum of $a$ and $b$ being always 6. These monomers have been fully described, among others, in my two copending applications, Ser. No. 382,385, filed July 13, 1964 and Ser. No. 467,736, filed June 28, 1965.

One embodiment of this invention is the copolymerization of a substituted trimeric phosphonitrile (which has two remaining halo groups attached to phosphorus in the phosphonitrilic ring) with a dialkali metal salt of an aliphatic or aromatic diol in a suitable solvent or with the diol in the presence of an acid acceptor.

Another embodiment of this invention is the copolymerization of a mixture of substituted trimeric phosphonitriles (which have two or three halo groups attached to phosphorus in the phosphonitrile ring) with an equivalent amount of dialkali metal salt of an aliphatic or aromatic diol so that there is one metal —O— equivalent for each remaining halo group in the mixture.

Still another embodiment of this invention is the copolymerization of a substituted trimeric phosphonitrile (which has three remaining halo groups attached to phosphorus in the ring) with an excess of aliphatic or aromatic diol in the presence of an acid acceptor in a suitable solvent or with an equivalent amount of dialkali metal salt of the diol in a suitable solvent.

A preferred practice of this invention is to react a nongeminal tetraaryloxy dichloro "trimeric" phosphonitrile (one chlorine on each of two different phosphorus atoms) with the disodium salt of aryl diol in a polyether solvent to yield a linear polymer.

Another preferred practice of this invention is to react a mixture of non-geminal tetraaryloxy dichloro trimeric phosphonitrile and non-geminal triaryloxy trichloro trimeric phosphonitrile with the disodium salt of an aryl diol such as bis-phenol A (4,4'-isopropylidene diphenol) to yield a partially crosslinked polymer.

Prior art

The reaction between difunctional diols and mixed phosphonitrilic chlorides $[(PNCl_2)_x$ where $X=3-7]$ was studied by C. A. Redfarn, see U.S. Patent 2,866,773. The products from these reactions were thermoset resins that were dark in color and still contained a large amount of unreacted chlorine which effected hydrolytic and oxidative stability. Redfarn et al. in British Patent 940,648 further synthesized polymers from alkoxylated mixed phosphonitriles and aromatic diols which processed better but were thermally less stable than the corresponding chlorine containing derivatives. The reactions between phosphonitrilic chloride trimers and tetramers, with excess aromatic diols yielded polymers which contained much smaller amounts of residual chlorine. See U.S. Patent 3,121,704. These resins found use as high temperature coating materials with good dielectric properties, but were highly crosslinked and brittle. They were compounded with other polymeric materials to enhance these mechanical properties with a subsequent loss in thermal stability. See U.S. Patent 3,108,989 and U.S. Patent 3,219,515. In my two previous patent applications, phosphonitrilic polymers which are linear are described. The phosphonitrilic rings are substituted by thermally stable groups and are hooked together with P—O—P linkages, giving a completely inorganic backbone. These polymers show good hydrolytic stability at room temperature, but under severe conditions, they are attacked and hydrolyzed, especially at lower molecular weights.

The phosphonitrilic polymers produced by my invention are generally white powders which can be fused and crosslinked into hard, clear, light-colored, thermally stable materials.

One of the principal advantages of the resins of my invention is their improved appearance and improved mechanical properties as compared with phosphonitrilic polymers prepared from the unsubstituted phosphonitrilic chlorides with aromatic diols. The resins of my invention are lower in crosslink density and can be prepared with greater flexibility and higher solubility in organic solvents. They can be heated to much higher temperatures without crosslinking and can be thermally extended in molecular weight without crosslinking. They can be cast into films or laminated with glass.

Another advantage of the polymers of my invention is their hydrolytic stability. These polymers can be made with negligible amounts of hydrolyzable groups such as halogen and are resistant to hydrolytic attack. They are more resistant to hydrolysis than the P—O—P polymers described in my previous inventions, losing less than 5% of their weight when treated with boiling water for four hours under atmospheric conditions.

My polymers have excellent thermal stability. They show negligible weight losses at 300° C. for as long as 6 hours under inert atmosphere and no indication of volatile products by VPC after a sample was heated at 300° C. for 24 hours. Furthermore, the thermogravimetric analysis of the sample in air is not significantly different from that in nitrogen which indicates that the material is stable at high temperatures in air. Furthermore, they are resistant to burning and will not support combustion when removed from a direct flame. These polymers are good electrical insulators and can be used for various electrical applications.

The phosphonitrile halides that are suitable for use in the polymerization are trimeric halides of phosphonitriles or a mixture of these halides where the number of halides remaining on the phosphonitrile ring are reduced to two or three reactive halogens. These monomers and their preparation are fully described in my copending application Ser. Nos. 467,736 and 382,385, the teachings of which are incorporated by reference herein. In general, the trimeric halides or a mixture of these are partially substituted with phenoxy groups, substituted phenoxy groups or a mixture of phenyl and phenoxy or substituted phenoxy groups.

Suitable non-reactive or blocking groups are the phenoxy and phenylthio groups and ring-substituted derivatives thereof wherein one or more of the ring hydrogens are replaced by (1) an alkyl group having from 1 to 8 carbon atoms, (2) a halo group, particularly, chloro-, fluoro-, and bromo-, (3) a fluoromethyl group such as trifluoromethyl, (4) a phenoxy group, (5) a phenyl group, and/or (6) a benzyl group. The total number of carbon atoms of the group or groups replacing the ring hydrogen must not exceed eight.

The non-reactive or blocking group is introduced on the phosphonitrile ring by the reaction of an alkali metal salt of the blocking group with the phosphonitrile halide in alcohol solution. The parent of the alkali metal salt must have an acidic hydrogen which will completely react with alkali metal in the presence of a secondary alcohol. Such compounds having the necessary acidic hydrogen include phenol, phenyl mercaptan, and their ring-substituted derivatives. The blocking group when introduced on the phosphonitrile ring must then be stable to heat, hydrolysis and rearrangement, and must not undergo reaction in the copolymerization of the monomers.

Some of the phenols which may be used in forming the partially blocked phosphonitriles are as follows: phenol; o-, m-, and p-cresols; o-, m-, and p-chlorophenols; o-, m-, and p-bromophenols; o-, m-, and p-fluorophenols; o-, m-, and p-methoxyphenols; o- and p-phenylphenols; o- and m-phenoxyphenols; m-trifluoromethylphenol; octylphenol; 1,1,3,3-tetra-methylbutylphenol; 4-chloro - 3,5-dimethyl phenol; 2,4-, 3,5-, 2,6-, 2,5- and 3,4-xylenols; 2,6-di-t-butylphenol; 2,4-dichlorophenol; 2,4,6-tribromophenol; 2,4,5- and 2,4,6-trichlorophenols; 2,3,4,6-tetrachlorophenol; pentachlorophenol; pentabromophenol; p-benzyl phenol; benzenethiol; p - chlorobenzenethiol; 4-fluorobenzenethiol; p - toluenethiol; trifluoromethyl - benzenethiol; pentachlorobenzenethiol; p - benzyl-benzenethiol; p - phenoxybenzenethiol; m-phenylbenzenethiol; pentabromobenzene thiol.

The introduction of these blocking groups results in the formation of the following types of compounds, where Y represents the blocking group or combinations of blocking groups:

$P_3N_3Y_4Cl_2$; $P_3N_3Y_4Br_2$; $P_3N_3Y_3Cl_3$; $P_3N_3Y_3Br_3$; $(C_6H_5)_2P_3N_3Y_2Cl_2$; $(C_6H_5)_2P_3N_3Y_2Br_2$.

Preferably, these partially blocked materials have no more than one halogen atom on each phosphorus in the ring compound.

The preferred blocking group for the desired monomers in these polymerizations are phenoxy, o- and p-chlorophenoxy and mixtures of phenyl and phenoxy.

The monomer then can be a mixture of partially substituted phosphonitriles with a total of more than two moles reactive halogen groups and less than three moles of reactive halogen per mole of phosphonitrile which when reacted with a difunctional comonomer can produce degrees of crosslinking in the polymer.

For the reactive group it is convenient to use halogen, the halogens originally attached to the phosphonitrile ring, and chlorine is therefore preferred. Bromine can also be used.

The comonomers used in these reactions are generally polyhydroxy compounds. Aromatic polyhydroxy compounds are generally preferred because of their inherently greater thermal stability but aliphatic hydroxy compounds such as p-xylene-α, α'-diol (HOCH$_2$—C$_6$H$_4$—CH$_2$OH) and hexafluoropentenediol can be used. Such polyhydroxy compounds are: resorcinol (1,3-dihydroxybenzene), hydroquinone (1,4-dihydroxybenzene), bisphenol A (HO—C$_6$H$_4$—C(CH$_3$)$_2$—C$_6$H$_4$OH), bisphenol AF (HO—C$_6$H$_4$—C(CF$_3$)$_2$—C$_6$H$_4$OH), oxybisdiphenol (HO—C$_6$H$_4$—O—C$_6$H$_4$OH), p,p'-diphenol (HO—C$_6$H$_4$C$_6$H$_4$—OH), bis-(p-hydroxyphenyl) methane (HO—C$_6$H$_4$—CH$_2$—C$_6$H$_4$—OH) and the isomers of dihydroxy naphthalene such as 2,7-dihydroxnaphthalene.

The preferred method of polymerization is to form an alkali metal salt of the polyhydroxy aromatic by reacting at least two of the hydroxy groups with a reactive alkali metal or compound in an inert solvent, then the partially blocked phosphonitrile is reacted with the salt of the polyhydroxy aromatic to yield the polymer and an inorganic salt as a by-product.

Accordingly, it is possible to react the dialkali metal salt of a dihydroxy aromatic such as bisphenol A with a difunctional phosphonitrile monomer such as $$P_3N_3(OC_6H_5)_4Cl_2$$

and obtain a linear polymer without crosslinking or to react an equivalent amount of this salt with a mixture of $P_3N_3(OC_6H_5)_4Cl_2$ and $P_3N_3(OC_6H_5)_3Cl_3$ to obtain a desired crosslinking effect.

Generally, the polymers have a molecular weight from 2000 to 100,000. Although higher and lower molecular weight material can be formed, the degree of polymerization is at least 3.

The preferred method of forming alkali metal salts from the polyols is to react them with an equivalent amount of sodium hydride although other standard methods of preparation from such materials as alkali metals, metal hydroxides, alkoxides and alkyls are also possible. The limitation being on the reactivity of the compounds with the hydroxy groups on the polyol. After the first OH is substituted, further reaction is usually more difficult. Another limitation in the source of alkali metal is the possibility of side reactions. Sodium and potassium salts are preferred because of their solubility characteristics, reactivity and availability.

A number of solvents are adequate for the polymerization. The criteria for their acceptability being that they do not enter into the reaction and that the alkali metal salt has some solubility in the solvent. The classes of solvents that fit into this category are ethers, ketones, amides, nitriles and esters. The preferred solvents are ethers, specifically the polyethers such as monoglyme (CH$_3$—O—CH$_2$CH$_2$—O—CH$_3$), diglyme $$(CH_3O—CH_2CH_2—O—CH_2CH_2OCH_3)$$

triglyme $$(CH_3—O—CH_2CH_2—O—CH_2CH_2—O—CH_2CH_2OCH_3)$$

These have the advantage that they complex alkali metals and they are completely miscible with water.

Because of the low solubility of the alkali metal salts of polyols in these solvents, the time and temperature of the reactions are important. In the preferred solvents, the reaction is run between 60° C. and 200° C., preferably at 80° C. to 165° C. from 15 hours to five days, preferably from 30 to 96 hours. The reaction is run in inert atmosphere and dry solvents to prevent hydrolysis of the salts. The reaction is heterogeneous; the ratio of solvent to reactant is not critical. The molar ratio of solvent to partially blocked phosphonitrile monomer ranges from 10/1 to 150/1 with a preferred ratio of 30/1 to 60/1.

Since the reaction is heterogeneous, it does not appear that the mode of addition is critical. For convenience, the alkali metal salt of the polyols are made in situ when possible in the same solvent that is used for the copolymerization, the partially blocked phosphonitrile is then added. When hydrides are used, such as sodium hydride, the alkali salt formation can be conveniently run at room temperatures in polyethers (monoglyme, diglyme, etc.). In order to insure complete formation of the sodium salt, the polyether mixture is heated at reflux for 15 to 60 minutes before the partially blocked phosphonitrile is added.

The polymers are hydrolysis resistant and can be isolated by precipitation into water. Residual mineral oil (commercially available alkali metal hydrides contain mineral oil) is then removed by precipitation into heptane from benzene solution.

In some instances, notably in ortho and para substituted polyhydroxy aromatics such as hydroquinone, pyrogallol, and 1,4-naphthalenediol, side reactions occur in attempts to form sodium salts. In these cases another route to polymers, although it is not as satisfactory, is by reaction of the partially blocked phosphonitrile with the polyhydroxy aromatic in excess and in the presence of an acid acceptor such as pyridine.

In this reaction, the number of moles of polyol is usually in excess to the extent of 1.1 to 2.0 times the number of mole atoms of halogen in the partially substituted phosphonitrile. The preferred ratio is 1.2–1.5 times the mole atoms of halogen. The acid acceptor is usually a tertiary amine. Among these are pyridines, aliphatic tertiary amines and quinoline. The preferred base is pyridine and is added in equimolar ratios to that of the polyol.

The solvent for the reaction is a hydrocarbon or chlorinated hydrocarbon. The preferred solvent is carbon tetrachloride or chlorobenzene. The reaction is conveniently run at the reflux temperature of the solvent. The range of temperatures that can be used is between 60° C. and 135° C., preferably between 80° C. and 100° C. The ratio of solvent used is in the range of 10 moles to 80 moles of solvent per mole of partially blocked phosphonitrile starting material. The preferred ratio is between 25 to 50 moles of solvent per mole of partially blocked phosphonitrile.

The reaction times are long, ranging from 48 hours to 10 days, the preferred reaction time being between 4 to 8 days. The products are separated by evaporating the solvent and taking up the residue in acetic acid-water mixture which ranges in a ratio of 1/1 to 5/1 parts of glacial acetic acid per part of water. The product is then precipitated by pouring the solution into large volumes of water, 10 to 100 times the volume.

To more fully describe the instant invention attention is directed to the following examples:

EXAMPLE 1

The disodium salt of 4,4′-isopropylidene diphenol (bisphenol A) was prepared by the reaction of 9.6 g. (0.20 mole) of a 50% suspension of sodium hydride in mineral oil with 22.8 g. (0.10 mole) of recrystallized bisphenol A (from toluene, M.P. 157.5–158.5° C.) in 200 ml. of dry monoglyme ($CH_3O—CH_2—CH_2—OCH_3$). Evolution of hydrogen occurred at room temperature. To insure complete reaction, the mixture was heated to reflux for one hour under an inert atmosphere. The reaction mixture remained heterogeneous. 57.8 g. (0.1 mole) of $P_3N_3(OC_6H_5)_4Cl_2$ as prepared according to my patent application Ser. No. 467,736, filed June 28, 1965, in 100 ml. of monoglyme was added to the cooled solution which was then refluxed at 80° C. for 72 hours under an inert atmosphere. The reaction mixture was cooled and filtered. The residue contained mostly sodium chloride and some unreacted bisphenol A. The filtrate on evaporation gave 80.9 g. of a yellow semi-solid. This residue was dissolved in 200 ml. of benzene and then precipitated by dropwise addition of the polymer solution into 1500 ml. of heptane. 70.4 g. of a white solid was collected (95.5% yield) and air dried. The polymer had the following properties and analysis.

For

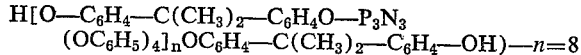

C=64.10 percent; H=4.75 percent; N=5.55 percent; P=12.20 percent; Cl=0 percent; OH=0.56 percent. Mol. wt.=6097; P/N ratio=1.00/1.00. Found: C=63.02 percent; H=5.19 percent; N=5.70 percent; P=12.31 percent; Cl=0.09 percent; OH=1.0. Mol. wt.=6153 (no. average—osmometer) Na=0.21 percent; P/N ratio =1.00/1.03.

The polymer showed 8.9% X-ray crystallinity and gave a melting point on the DTA (8° C./min.) of 56° C. The infrared spectrum showed the presence of $P_3N_3$ rings in the polymer. A 0.5 g. sample lost 4.4% weight on contact with distilled water for 24 hours at room temperature and 4.6% after 4 hours of reflux under atmospheric conditions.

EXAMPLE 2

Bisphenol A (22.6 g., 0.1 mole) was reacted with 9.6 g. of sodium hydride (50% in mineral oil) in 300 ml. of dry diglyme ($CH_3O—CH_2CH_2O—CH_2CH_2OCH_3$). 95% of the theoretical amount of hydrogen was measured during the formation of the salt by a wet test meter. 57.8 g. (0.1 mole) of $P_3N_3(OC_6H_5)_4Cl_2$, the same material as in Example 1, was added in 200 ml. of dyglyme and refluxed for four days at 165° C. in an inert atmosphere. The reaction mixture was cooled and poured into 8 liters of distilled water which was being stirred by a high speed stirrer. The white residue was filtered and dried overnight in a vacuum oven. 64.6 g. (88% yield) of a white powder was obtained with the following properties: Cl=0.30 percent; OH=0.49 percent; Na=0.06 percent; mol. wt.=2490. Infrared examination showed that the material contained some mineral oil. A sample was reprecipitated from benzene-heptane and lost 17.3% of its weight after drying. The purified polymer had the following properties and analysis:

For

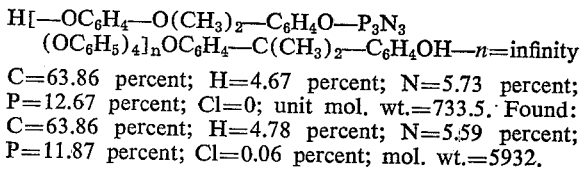

C=63.86 percent; H=4.67 percent; N=5.73 percent; P=12.67 percent; Cl=0; unit mol. wt.=733.5. Found: C=63.86 percent; H=4.78 percent; N=5.59 percent; P=11.87 percent; Cl=0.06 percent; mol. wt.=5932.

EXAMPLE 3

According to the procedure of Example 1, 0.5 mole (114.0 g.) of bisphenol A was reacted with 48.0 g. of sodium hydride in 750 ml. of monoglyme. 287.0 g. of $P_3N_3(OC_6H_5)_4Cl_2$ in 500 ml. of monoglyme was added and reacted 96 hours at 80° C. (reflux) under an inert atmosphere. The mixture was poured into 7 l. of distilled water and 364 g. (99% yield) of crude material were isolated. 50 grams of the crude material were stirred with 1000 ml. of heptane for two hours at room temperature. The sample was filtered and dried; 98% of the material was recovered with a mol. wt. of 5165. 302 g. of the crude were dissolved in 700 ml. of benzene and reprecipitated into 7 liters of heptane. 284 g. (94%) of the product was isolated and had a molecular weight of 5420.

EXAMPLE 4

According to the procedure for Example 3, 0.105 mole of the disodium salt of bisphenol A was prepared in 300 ml. monoglyme. 52.0 g. (0.09 mole) of $$P_3N_3(OC_6H_2)_4Cl_2$$

and 0.01 mole, 5.21 g. of $P_3N_3(OC_6H_5)_3Cl_3$ were reacted in 200 ml. of monoglyme for 72 hours at 80° C. 75.4 g. of polymer was collected by precipitating the sample into 8 liters of distilled water (102% yield). The crude material gave the following analysis: Cl=1.33 percent; OH=0.33 percent; mol. wt.=3326. The sample was dissolved in benzene and precipitated into heptane in 93% yield. The polymer had the following properties and analysis:

Theory for a polymer with 10% crosslinks from $P_3N_3(OC_6H_5)_3Cl_3$ addition is: C=63.92 percent; H=4.68 percent; N=5.72 percent P=12.63 percent. Mol. wt./unit=735.5; Cl=0 percent. Found: C=64.03 percent; H=5.29 percent; N=5.39 percent; P=11.15 percent; Cl=0.25 percent; OH=0.15 percent. Mol. wt.=7317.

EXAMPLE 5

According to the procedure described in Example 1, 32.2 g. (0.15 mole) of bisphenol A was reacted with 14.4 g. (0.3 mole) of sodium hydride in 300 ml. of monoglyme. 52.1 g. (0.1 mole) of $P_3N_3(OC_6H_5)_3Cl_3$, prepared as described in patent application 467,736, filed June 28, 1965, was added in 200 ml. of monoglyme and reacted according to the procedure described in Example 1. 87.5 g. of crude polymer was obtained. The material was insoluble in benzene and other organic solvents but was swelled in organic solvents. It was rubbery to above 160° C. The analysis and properties of the polymer are as follows:

Theory: P=12.33 percent; N=5.58 percent; Cl=0 percent; P/N ratio=1.00/1.00. Found: P=9.79 percent; N=3.78 percent; Cl=8.27 percent; P/N ratio=1.13/1.00.

The material could be molded into disks under 15 tons pressure at 600° F. The material was very hard and showed a Shore D hardness of 75-85.

EXAMPLE 6

0.2 mole of metallic sodium was reacted with 22.8 g. of bisphenol A in 500 ml. of isopropanol. The isopropanol was evaporated and replaced by 600 ml. of monoglyme. 57.8 g. of $P_3N_3(OC_6H_5)_4Cl_2$ was added and the reaction was carried out as in Example 1. The product, 56.0 g. was collected by precipitation in a benzene-heptane system. The analysis and properties of the polymer are as follows:

Theory: C=63.86 percent; H=4.67 percent; Cl=0 percent. Unit wt.=733.5. Found: C=62.13 percent; H=4.70 percent; Cl=1.74 percent; OH=1.74 percent; Na=0.6 percent. Mol. wt.=2615.

The poymer was amorphous, it showed less than 1% crystallinity by X-ray powder pattern.

EXAMPLE 7

22.42 g. (0.2 mole) of potassium butoxide and 22.83 g. (0.1 mole) of bisphenol A were placed in a reactor with 500 ml. of dry diglyme. The mixture was heated to reflux and t-butyl alcohol (B.P. 78–80° C.) was distilled from the reactor through a Nichrome helipak column. Diglyme was then removed from the reaction flask until no more t-butyl alcohol was detected in the diglyme distillate by gas chromatography. The solution was cooled and 58.7 g. of $P_3N_3(OC_6H_5)_4Cl_2$ was added to the solution in 100 ml. of diglyme. The reaction was again heated to reflux under an inert atmosphere and refluxed for 72 hours. The mixture was poured into eight liters of distilled water, filtered and dried under vacuum at 40° C. for 48 hours. 65 grams (86%) of polymer was obtained.

EXAMPLE 8

According to the general procedure described under Example 1, bisphenol AF (HO—$C_6H_4$—$C(CF_3)_2$—$C_6H_4$OH) was reacted with sodium hydride with evolution of 100% of the expected hydrogen within two hours at room temperature. $P_3N_3(OC_6H_5)_4Cl_2$ was then reacted according to the conditions described in the following table.

The products were isolated by stirring the reaction mixtures into 8 liters of water. A second precipitation from monoglyme water was made. The crude product from sample 2 contained 1.25% OH, 0.98% Cl, Na=0.15 percent, and had a molecular weight of 1981. The crude product from sample 3 contained 0.23% OH, 0.93% Cl, Na=0.10 percent, and had a molecular weight of 2502. This product was reprecipitated from a benzene-heptene mixture with a 20% loss in yield. The purified sample showed the following properties.

Found: C=55.44 percent; H=3.43 percent; P=9.92 percent; N=4.85 percent; Cl=0.03 percent; OH=0.20 percent. Mol. wt.=6455 (osmometer in benzene). Theory: C=56.21 percent; H=3.39 percent; P=11.15 percent; N=5.04 percent; Cl=0 percent.

The sample was amorphous by X-ray examination.

EXAMPLE 9

According to the procedure described in Example 2, 4,4'-diphenol (18.6 g., 0.1 mole) was reacted with 0.2 mole of sodium hydride in 335 ml. diglyme yielding 96% of the hydrogen calculated from theory. 57.8 g. of $P_3N_3(OC_6H_5)_4Cl_2$ in 200 ml. of diglyme were added and the reaction was run for 96 hours at 165° C. The polymer was isolated by precipitation into water according to Example 8. 44.2 g. were collected with the following analysis: Cl=0.14 percent; OH=0.62 percent; Na=0.11 percent. Mol. wt.=2197.

The crude material was reprecipitated by dissolving in benzene and reprecipitation into heptane resulting in a 13% loss in yield and a white polymer with the following properties:

Found: C=62.30 percent; H=4.28 percent; P=12.80 percent; N=5.86 percent; Cl=0.13 percent; OH=0.78 percent. Mol. wt.=2840. Theory: C=62.54 percent; H=4.08 percent; P=13.44 percent; N=6.08 percent; Cl=0 percent.

The sample showed 1–2% crystallinity by X-ray analysis.

EXAMPLE 10

According to the procedure described in Example 2, 4,4'-oxydiphenol (20.2 g., 0.1 mole) was reacted with 0.2 mole of sodium hydride in 300 ml. of diglyme. 57.8 g. (0.1 mole) of $P_3N_3(OC_6H_5)_4Cl_2$ in 250 ml. of diglyme were added and the reaction was run for 96 hours at 165° C. The polymer was isolated by precipitation into water, according to Example 8. 33.9 g. of crude white solid was collected which analyzed as follows: Cl=0.71 percent; OH=0.59 percent; Na=0.09 percent; mol. wt.=2314.

The crude material was reprecipitated from benzene-heptane solvent with a 12% loss in yield. The reprecipitated polymer has the following properties:

Found: C=61.03 percent; H=4.18 percent; P=12.63 percent; N=5.75 percent; Cl=0.07 percent; mol. wt. =4532. Theory: C=61.12 percent; H=3.99 percent; P=13.13 percent; N=5.94 percent; Cl=0 percent.

EXAMPLE 11

According to the procedure described in Example 2, 2,7-naphthalene diol (0.1 mole, 16.02 g.) is reacted with 0.2 mole of sodium hydride in 300 ml. of diglyme. 57.8 g. (0.1 mole) of $P_3N_3(OC_6H_5)_4Cl_2$ in 200 ml. of diglyme is added and the reaction is run for 96 hours at 165° C. The polymer is isolated by precipitation into water as described in Example 8. 29.8 g. of a tan solid is collected as the crude product which has the following analysis: Cl=0.45 percent; OH=0.51 percent; Na=0.05 percent; mol. wt.=2243.

EXAMPLE 12

According to the procedure described in Example 2,

| Sample | 50% NaH, grams (moles) | Solvent, ml. | $P_3N_3(OC_6H_5)_4Cl_2$, grams | Bisphenol AF, grams | Time, hrs. | Temp., °C. | Yield, grams |
| --- | --- | --- | --- | --- | --- | --- | --- |
| 1 | 9.6 (0.2.) | 400 | 57.8 | 33.62 | 18 | 80 | (1) |
| 2 | 9.6 (0.2.) | 500 | 57.8 | 33.62 | 96 | 80 | 75.3 |
| 3 | 9.6 (0.2.) | 500 | 57.8 | 33.62 | 72 | 165 | 75.4 |

[1] 50% of bisphenol AF was recovered from the reaction mixture.

11.0 g. (0.1 mole) of resorcinol is reacted with 0.2 mole of sodium hydride in 300 ml. of diglyme. 0.1 mole (57.8 g.) of $P_3N_3(OC_6H_5)_4Cl_2$ in 200 ml. of diglyme is added and the reaction mixture is refluxed at 165° C. for 120 hours in an inert atmosphere. The polymer is isolated as a tan solid by precipitation into water according to the procedure of Example 8. 20.0 g. is collected with a mol. wt. for the crude material of 1773, OH=0.57 percent; Cl=0.13 percent and Na=0.05 percent.

When the reaction is repeated in 550 ml. of monoglyme for 168 hrs. at 80° C. starting from the lithium salt prepared by use of lithium hydride, the product that is isolated is a semi-solid of lower molecular weight.

EXAMPLE 13

As in Example 2, 13.82 g. (0.1 mole) of 1,4-benzene dimethanol (p,p'-xylene-α,α'-diol $HOCH_2—C_6H_4—XCH_2OH$)

is reacted with 0.2 mole of sodium hydride in 375 ml. of diglyme; then, 58.7 g. (0.1 mole) of $P_3N_3(OC_6H_5)_4Cl_2$ is added in 150 ml. of diglyme. The reaction proceeds under an inert atmosphere for 144 hours at 165° C. The product is isolated by precipitation into water as described in Example 8. 15.2 g. of a tan solid, crude yield is collected. The product still contains 1.09% Cl, 2.32 OH and has a mol. wt. of 1114 before removal of the residual mineral oil.

EXAMPLE 14

A substituted phosphonitrile and hydroquinone in a mole ratio of 1.25 hydroquinone for each chlorine present in the phosphonitrile are heated to reflux in chlorinated solvents. Pyridine in a molar equivalent to the hydroquinone present is added to the solution and the reaction is run up to a period of seven days under an inert atmosphere. The oil layer is separated from the solution and dissolved in a 4/1 acetic acid-water solution. The polymers are precipitated by pouring into water and vacuum drying the product. The data on these preparations in carbon tetrachloride are presented below.

EXAMPLE 16

0.1 mole of $P_3N_3(OC_6H_4CF_{3(m)})_4Br_2$ is reacted with 0.1 mole of the disodium salt of 4,4'-oxybisdiphenol in 500 ml. of triglyme solvent $(CH_3—O—CH_2CH_2—O—CH_2—CH_2—O$
$—CH_2CH_2—OCH_3)$ at 185° C. for 72 hours. The product is isolated by precipitation from water. The polymer is collected in 78% yield. It is soluble and low melting.

EXAMPLE 17

0.05 mole of $P_3N_3(C_6H_5)_2(OC_6H_5)_2Cl_2$ is reacted with 0.05 mole of the disodium salt of p,p'-methylenediphenol according to the procedure described in Example 2. The product is isolated in the usual manner. A tan solid is collected in 60% yield.

EXAMPLE 18

A mixture of 0.1 mole of $P_3N_3(C_6H_5)_4Cl_2$ and 0.05 mole of $P_3N_3(C_6H_5)_3Cl_3$ is reacted with 0.17 mole of the dipotassium salt of p,p'-biphenol according to the procedure described in Example 2. The product that is isolated is not very soluble in organic solvents.

EXAMPLE 19

0.1 mole of $P_3N_3(OC_6H_5Cl_{(o)})_4Cl_2$, a yellow oil, is reacted with 0.1 mole of the disodium salt resorcinol according to the procedure described in Example 2. The product that is isolated is a tan solid that is very low melting.

EXAMPLE 20

The disodium salt of 1,5-hexafluorobutanediol, 0.15 mole is reacted with 0.1 mole of $P_3N_3(OC_6H_5)_3Cl_3$ according to the procedure described in Example 4. The polymer is collected in good yield.

| Sample | Substituted phosphonitrile (mole) | Hydroquinone (mole) | Pyridine (mole) | CCl₄, ml. | Time, days | Yield, gms. | Percent OH |
|---|---|---|---|---|---|---|---|
| 1 | $P_3N_3(OC_6H_5)_4Cl_2(0.1)$[1] | 0.25 | 0.25 | 250 | 7 | 46 | |
| 2 | $P_3N_3(OC_6H_5)_3Cl_3(0.1)$[2] | 0.38 | 0.38 | 375 | 0.7 | 43 | 6.7 |
| 3 | $P_3N_3(OC_6H_5)_3Cl_3(0.1)$[2] | 0.38 | 0.38 | 375 | 3.5 | 61 | 5.0 |
| 4 | $P_3N_3(OC_6H_5)_3Cl_3(0.2)$[2] | 0.75 | 0.75 | 750 | 7 | 125 | 4.3 |
| 5 | $P_3N_3(OC_6H_5)_3Cl_3(0.2)$[1] | 0.75 | 0.75 | 750 | 7 | 131 | 4.3 |

[1] Prepared as in Serial No. 467,736, June 28, 1965.
[2] Prepared as in Serial No. 382, 380, July 13, 1964, procedure B in monomer prep.

The solid from sample 1 is dark amber, soft semisolid that melted between 50–60° C. It can be cured into a hard, shiny, dark resin by heating at 750° F. for 15 minutes in an inert atmosphere.

The products from samples 2–5 range from semisolid to higher melting solid. The product, sample 4, is made from a mixture geminal and non-geminal isomers of $P_3N_3(OC_6H_5)_3Cl_3$. It has a molecular weight of 1022, OH content=4.30 percent and Cl=2.86 percent. The completely non-geminal isomers of $P_3N_3(OC_6H_5)_3Cl_3$, sample 3, yielded a polymer of mol. wt. of 1039, 4.34% OH and 3.93% Cl. Both materials could be cured into hard insoluble resins by heating to 700° F. for 15 minutes under nitrogen or with 10% hexamethylenetetramine (10% by weight) in a press at 1½ atm. pressure and 470° F. for one hour.

EXAMPLE 15

A mixture of 80% $P_3N_3(OC_6H_5)_4Cl_2$ and 20% $P_4N_4(OC_6H_5)_6Cl_2$ containing 0.2 mole of chloro groups is reacted with 0.1 mole of the sodium salt of bisphenol A according to the procedure described in Example 1. The polymer is isolated by precipiation into water, then reprecipitated into heptane from benzene in 80% yield.

EXAMPLE 21

0.1 mole of $P_3N_3(OC_6H_4F_{(p)})_4Cl_2$ is reacted with 0.2 mole of the disodium salt of bisphenol A according to the procedure of Example 1. The product, a yellow oil, is isolated in good yield after removal of the solvent and washing of the sample in benzene solution with water. The sample is dried and isolated. 0.5 mole of the product, $P_3N_3(OC_6H_4F_{(p)})_4(O—C_6H_4—C(CH_3)_2—C_6H_4OH)_2$ is reacted with sodium hydride to yield the salt in monoglyme. 0.5 mole of $P_3N_3(OC_6H_5)_4Cl_2$ is added and the polymer is isolated after 5 days of reflux under an inert atmosphere. The product is reprecipitated from benzene into heptane in poor yield.

EXAMPLE 22

Molecular weight extension

The polymer obtained in Example 6 is heated for one hour under high vacuum ($10^{-2}$–$10^{-5}$ mm.) at 310° C. There was about a 4% weight loss in the weight of the polymer after heating. The polymer dissolved in benzene and was reprecipitated from heptane. 90% of the original starting material was recovered. The molecular weight of the polymer increased from 2615 to 5012 after heat treatment.

Another sample of the polymer from Example 6 was heated at $10^{-4}$ mm. for 15 hours at $10^{-4}$ mm. and 310° C. The residual polymer was a hard yellow mass which dissolved slowly in benzene and was reprecipitated into heptane in 71% yield. The molecular weight of the polymer was increased to 9064. The properties of the starting polymer and the product are compared below.

Polymer before thermal extension: C=61.13 percent; H=4.70 percent; Cl=1.74 percent; OH=1.74 percent; Na=0.06 percent; mol. wt.=2615.

Polymer after thermal extension: C=62.46 percent; H=4.45 percent; Cl=1.10 percent; Na=5.86 percent.

EXAMPLE 23

Bisphenol A polymers of the partially blocked phosphonitriles can be readily cured by reacting with 4 parts per hundred of m-phenylene bismaleimide and one part per hundred of DiCCup 40C (40% dicumyl peroxide supported on precipitated calcium carbonate) in one hour at 182° C. The product is then 95% isoluble in organic solvents.

Having thus described my invention, what I claim and desire to protect by Letters Patent is:

1. A process for preparing a polymeric material which comprises reacting a substituted trimeric phosphonitrile having the formula $P_3N_3X_4Y_2$, wherein X is a blocking group selected from the group consisting of phenoxy, alkylphenoxy, chlorophenoxy, bromophenoxy, methoxyphenoxy, phenylphenoxy, phenoxyphenoxy, chloroalkylphenoxy, dialkylphenoxy, polychlorophenoxy, polybromophenoxy, benzylphenoxy and mixtures of phenyl and phenoxy or the preceding substituted phenoxy radicals and Y is chlorine or bromine with a dialkali metal salt of an aromatic diol selected from the group consisting of bisphenol A, bisphenol AF, oxybisdiphenol, p,p'-diphenol and bis-(p-hydroxyphenyl) methane in the absence of an acid acceptor.

2. The process of claim 1 wherein said diol is bisphenol A.

3. The process of claim 1 wherein said diol is oxybisdiphenol.

4. The process of claim 1 wherein said diol is diphenol.

5. The process of claim 1 in which a substituted trimeric phosphonitrile having the formula $P_3N_3X_3Y_3$ is present as an additional reactant in the amount of up to 10% of a molar basis of the total amount of substituted trimeric phosphonitrile present.

6. A linear polymer having the formula
$$H[O-R-O-P_3N_3X_4]_nOROH$$
wherein X is a blocking group selected from the group consisting of phenoxy, alkylphenoxy, chlorophenoxy, bromophenoxy, methoxyphenoxy, phenylphenoxy, phenoxyphenoxy, chloroalkylphenoxy, dialkylphenoxy, polychlorophenoxy, polybromophenoxy, benzylphenoxy and mixtures of phenyl and phenoxy or the preceding substituted phenoxy radicals, R is the radical resulting from the removal of the alcoholic hydrogen atoms from an aromatic diol selected from the group consisting of bisphenol A, bisphenol AF, oxybisdiphenol, p,p'-diphenol and bis-(p-hydroxyphenyl) methane, and $n$ is at least 3.

7. The product of claim 6 wherein R is $$-C_6H_4C(CH_3)_2-C_6H_4-$$

8. The product of claim 6 wherein R is $$-C_6H_4-C_6H_4-$$

9. The product of claim 6 wherein R is $$-C_6H_4-O-C_6H_4$$

10. A cross-linked polymer prepared by curing the polymer of claim 6 by reacting said polymer with a mixture of m-phenylene bismaleimide and dicumyl peroxide.

References Cited

UNITED STATES PATENTS

| 2,674,590 | 4/1954 | Zenftman | 260—61 |
| 3,121,704 | 2/1964 | Rice et al. | 260 |
| 3,194,787 | 7/1965 | Redfarn | 260 |
| 3,230,252 | 1/1966 | Bezman et al. | 260 |

FOREIGN PATENTS

| 1,343,907 | 10/1963 | France. |
| 1,013,462 | 12/1965 | Great Britain. |

OTHER REFERENCES

Garner et al.: OTS Report AD 428598 (Apr. 20, 1964), pp. 12, 14, 35 and 36.

Garner et al.: OTS Report AD 608982 (Feb. 6, 1965), pp. 6, 7, 19, 20, 31 and 32.

WILLIAM H. SHORT, *Primary Examiner.*

M. GOLDSTEIN, *Assistant Examiner.*

U.S. Cl. X.R.

260—33.6, 33.8, 61, 927